United States Patent
Rosenbluth (10) Patent No.: US 8,595,729 B2
(45) Date of Patent: Nov. 26, 2013

(54) MANAGING SEQUENCED LOCK REQUESTS

(75) Inventor: Mark B. Rosenbluth, Uxbridge, MA (US)

(73) Assignee: Intel Corporation, Santa Clara, CA (US)

( * ) Notice: Subject to any disclaimer, the term of this patent is extended or adjusted under 35 U.S.C. 154(b) by 1822 days.

(21) Appl. No.: 11/556,778

(22) Filed: Nov. 6, 2006

(65) Prior Publication Data

US 2008/0109807 A1 May 8, 2008

(51) Int. Cl.
*G06F 9/46* (2006.01)
(52) U.S. Cl.
USPC ........................................................ 718/102
(58) Field of Classification Search
USPC ........................................................ 718/102
See application file for complete search history.

(56) References Cited

U.S. PATENT DOCUMENTS

| | | | | |
|---|---|---|---|---|
| 6,029,205 | A * | 2/2000 | Alferness et al. | 719/310 |
| 7,639,709 | B1 * | 12/2009 | Amis et al. | 370/462 |
| 2006/0069959 | A1 * | 3/2006 | Schultz | 714/35 |
| 2007/0022429 | A1 | 1/2007 | Rosenbluth et al. | |
| 2007/0136725 | A1 * | 6/2007 | Accapadi et al. | 718/100 |

OTHER PUBLICATIONS

"Intel XScale Core, Developer's Manual"; Dec. 2000; 220 pgs.
"Thread (computer science)," retrieved on Sep. 27, 2006 (8 pages).
"Lock (computer science)," retrieved on Aug. 4, 2006 (3 pages).
Mellor-Crummey et al., "Algorithms for Scalable Synchronization on Shared-Memory Multiprocessors," ACM Trans. on Computer Systems, Feb. 1991 (41 pages).

* cited by examiner

*Primary Examiner* — Mengyao Zhe
(74) *Attorney, Agent, or Firm* — Grossman, Tucker, Perreault & Pfleger, PLLC (57) ABSTRACT

A method according to one embodiment may include determining if a sequence number of a first thread matches a current sequence number of a lock. If the sequence number of the first thread does not match the current sequence number, the method further includes placing the first thread into a wait queue; receiving a notification of an updated current sequence number by the first thread; determining if the sequence number of the first thread matches the updated current sequence number; acquiring the lock if the sequence number of the first thread matches the updated current sequence number; and remaining in the wait queue if the updated current sequence number does not match the sequence number of the first thread. Of course, many alternatives, variations, and modifications are possible without departing from this embodiment.

20 Claims, 6 Drawing Sheets

MANAGING SEQUENCED LOCK REQUESTS

FIELD OF THE DISCLOSURE

The present disclosure relates to the sharing of resources by multiple processing threads using locks, and more particularly to the management and implementation of locks for managing access to shared resources.

BACKGROUND

In a multi-threaded processing environment, two or more threads may require access to a common resource, for example, to modify a variable stored in shared memory, etc. Uncoordinated access to shared resources by multiple threads may result in more than one thread independently, and generally simultaneously modifying the data. The result of independent and simultaneous modification may be that the final data does not properly reflect each of the modifications, or may not reflect the cumulative effect of the modifications.

In software engineering, a lock is a mechanism for coordinating access to a shared resource in a multi-threaded environment. The lock may allow only one thread to access a resource at a given time. Because of the exclusive access, other threads will be prevented from modifying the data while another thread has a lock. The other threads desiring access to the shared resource may have to wait until the thread having the lock has finished with the resource and releases the lock. The sequential access to shared resources provided by locks may ensure that data is only modified by a single thread at any given time. Depending upon the system environment, the various threads in the multi-threaded environment may be running on a single processor, or on multiple processors.

BRIEF DESCRIPTION OF THE DRAWINGS

Features and advantages of the present invention will be apparent from the following description of exemplary embodiments consistent therewith, which description should be considered in conjunction with the accompanying drawings, wherein.

DESCRIPTION OF THE DISCLOSURE

A wide variety of applications may use locks to control access to shared resources. The order in which various threads are allowed to access the resource may be controlled by allowing or denying a lock. Threads which may desire access to a resource may be assigned sequence numbers ("thread SN") corresponding to a predetermined order in which the various threads may access the resource. The lock may include a data structure that may store a globally shared sequence number ("current SN"), indicating the sequence number of the thread which may currently acquire the lock to access the shared resource. As the various threads access the resource in turn, the current SN may be incremented to allow the next thread to access the resource.

Figure 1:
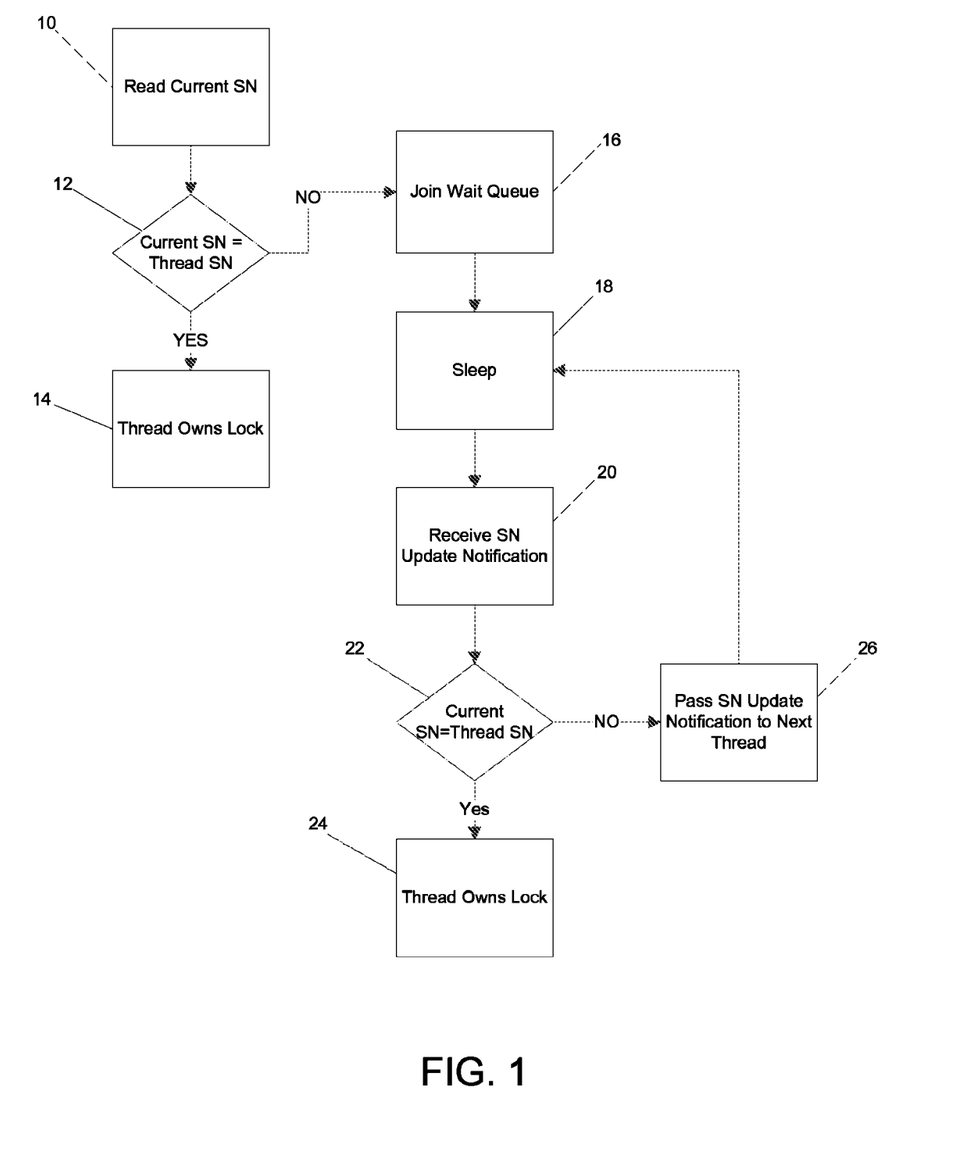
FIG. 1 shows a flow chart of the operations for acquiring a lock consistent with an embodiment of the present disclosure.

Referring to FIG. 1, an example of a process for acquiring a lock is shown. Initially, a thread wishing to acquire a lock to access the resource may determine if it is the thread's turn to access the resource, as prescribed by the sequence number assigned to the thread. The thread may read the globally shared current SN 10 and may compare the current SN to the thread SN 12, to determine if the sequence number assigned to the thread matches the globally shared current SN. If the thread SN matches the current SN, the thread may acquire the lock 14.

If the thread SN does not match the current SN, that is, if the thread is attempting to access the resource before its turn, then the thread may wait, even if the lock is currently available. As such, the thread may fail to obtain the lock, and the thread may join the wait queue 16. The thread may remain in the wait queue to await its turn to access the resource, as indicated by the thread's sequence number. Once in the wait queue, the thread may sleep 18 until the thread receives a sequence number update notification 20. The sequence number update notification may include a new current SN, which has been updated, e.g., incremented by a different thread upon that thread releasing the lock, since the sleeping thread initially attempted to acquire the lock. The sequence number update notification may include a signal provided to the wait queue to notify at least one thread in the wait queue. The sequence number update notification may awaken a thread, if necessary, e.g., if the thread is sleeping. The sequence number update notification may deliver a current sequence number to the thread or may cause the thread to read the current sequence number. Numerous other variations and modifications may also be employed.

Upon receipt of the sequence number update notification the thread may compare the updated current SN to the thread SN 22, in order to determine if the new current SN matches the thread's sequence number. If the current SN matches the thread SN, then it is now the threads turn to access the resource, and the thread acquires the lock 24. If the current SN does not match the thread SN, the thread may pass the sequence number update notification to the next thread in the wait queue 26. Once the thread has passed the sequence number update notification to the next thread in the queue, the thread may once again sleep 18 until the thread receives another sequence number update notification.

When initially comparing the thread SN to the current SN 12 to obtain the lock, if the thread SN does not match the current SN the thread may join the wait queue 16 to become the new tail of the wait queue. In an embodiment, in addition to including the current SN, the lock data structure may also include the identity of the tail of the wait queue ("tail"). For example, the lock data structure may include a pointer to the thread that is the tail of the wait queue. An indicator, such as nil for the tail identity, may be used by the lock data structure to indicate that the wait queue is empty. The thread failing to acquire the lock may swap its identity with the tail in the lock data structure. When the sequence number is updated, the sequence number update notification, including the new current SN, may be sent to the thread whose identity is stored at the tail in the lock data structure. Consistent with the foregoing, joining the wait queue may include associating a node with the wait queue, in which the node includes a data structure including, in part, an identifier of the thread and a pointer to the previous thread in the queue, if any.

In addition to writing its identity as the tail in the lock data structure, the thread joining the tail of the wait queue may store the identity of the previous tail of the wait queue. For example, the data structure of each node in the wait queue ("qnode") may include the identity of preceding thread ("prev" or "previous") on the wait queue. When the thread swaps its identity with the identity of the tail in the lock data structure, the thread may store the previous tail as its prev. Upon comparing the current SN of a sequence number update notification to the thread SN 22, if the thread SN and the current SN do not match, the thread may pass the new current SN, i.e., the sequence number update notification, to the thread's prev 26, as the next thread in the wait queue. The thread from which another thread receives the sequence number update notification may be stored in the receiving thread's qnode as a "from" field.

In a similar manner, if, upon comparing the new current SN of a sequence number update notification to the thread SN 22, the new current SN matches the thread SN the thread may acquire the lock. When the thread acquires the lock 24, the thread may pass its prev to the thread from which it received the sequence number update notification. The thread from which the thread acquiring the lock received the sequence number update notification may replace its prev with the prev of the thread which just acquired the lock. In this manner, the queue may be maintained as a continuous chain from the tail to the head, with each qnode including the identity of the preceding thread in the queue, even as a thread leaves the queue to acquire the lock. A subsequent sequence number update notification may, accordingly, be passed from the tail of the queue to the head of the queue if necessary. If the thread which acquired the lock was the tail, then the thread acquiring the lock may update the tail of the lock data structure with its prev, or nil, if no other threads remain on the queue. The lock data structure may, therefore, maintain an accurate pointer to the current tail of the wait queue.

Receiving the sequence number update notification from a following thread in the wait queue and passing the sequence number update notification to the preceding thread in the wait queue avoids the need for the threads waiting to acquire the lock to be organized according to the order in which the thread may acquire the lock. This may avoid the need to reorder the threads on the queue each time a new thread joins the queue out of order.

Table 1 below provides pseudo-code for an exemplary embodiment of lock data structure and qnode data structure. As shown, the lock data structure may include the current SN corresponding to the thread SN which may acquire the lock. The lock data structure may also include a pointer to the thread forming the tail of the wait queue. In the exemplary lock data structure, if the queue is empty the tail value of the lock data structure may be nil. In the exemplary qnode data structure, each qnode may include a thread identifier and the thread SN. Each qnode may also a pointer to the previous thread in the wait queue. Additionally, each qnode may include the sequence number that was passed, e.g., via a sequence number update notification, as well as the thread from which the sequence number was passed.

TABLE 1

Pseudo-code of exemplary lock data structure and qnode data structure.

```
// Datastructures per lock. Stored in shared memory.
type nxtSN : int     // Next SN to assign to threads.
type lock = record   // Datastructure for each lock.
    tail : ^qnode            // Current tail; nil if queue is empty.
    currSN : int            // Next-to-go SN. Counts from 0 to max SN.
// Datastructures used by threads using a lock.
type mySN : int      // Thread's assigned SN.
type qnode = record  // Datastructure used by thread to track lock.
    prev : ^qnode           // Previous thread on queue; nil if thread is head of queue.
    from : ^qnode           // Thread which passed SN to this thread.
    SN : int               // SN which was passed to this thread.
```

Table 2 provides pseudo-code for an exemplary embodiment of a procedure for acquiring a lock consistent with the present disclosure. The procedure provided by the exemplary pseudo-code generally corresponds to the preceding description and the corresponding flow diagram of FIG. 1. The exemplary pseudo-code, in part, implements the exemplary lock data structure and the exemplary qnode data structure set forth in Table 1.

TABLE 2

Pseudo-code corresponding to an exemplary process to acquire a lock.

```
procedure acquire_lock (L : ^lock, I : ^qnode)
    tmp_lck, act_lck : lock
    tmp_lck->currSN = -1    // -1 is used as a "busy" flag
    tmp_lck->tail = I        // my qnode
    repeat
        // Get the current SN. Temporarily put -1 into current SN and
        // my qnode on tail. This will only need one try unless another
        // thread is trying at the same time.
        act_lck = swap(L, tmp_lck)
    until (act_lck->currSN != -1)
    if mySN = act_lck->currSN
        // Current SN is my SN, so its my turn.
        // Replace current SN and tail to previous state.
        write(L, act_lck)
        return              // Now have the lock
    else
        // Current SN is not my SN so its not my turn yet.
        // Write back the current SN and my qnode so I am at
        // end of queue. Note that tmp_lck->tail has my qnode, which is
        // the value already in memory. Therefore the write will not
        // change the tail value in memory; it will only change the
        current SN.
    tmp_lck->currSN = act_lck->currSN
    write(L, tmp_lck)
    I->wait := true    // Flag which I wait on.
    I->prev := act_lck->tail   // Save current tail (which might be nil)
        repeat while true
        // Now loop waiting until my SN gets passed in.
        // When the SN I am waiting for arrives the return statement will
        // exit the loop. For every case, the SN passed in here will need to
        // be put back into the lock datastructure, which has -1 in current
        // SN at this point. The value of tail written in will be changed if
        // the thread at end of queue gets the lock, or left unchanged
            otherwise.
        new_lck : lock
        new_lck->currSN := I->SN
        repeat while I->wait // spin here until a new SN is passed to me
            // A new SN was passed in. Check it to see if its my turn.
```

TABLE 2-continued

Pseudo-code corresponding to an exemplary process to acquire a lock.

```
    if I->SN = mySN
        // Its my turn...remove myself from the queue. This
        // is done by either putting my prev on tail (if I
        // was on tail), or sending prev to the thread following
        // me. Note that my prev may be nil if I was on head
        // of queue. Also have to put the SN (which is mySN)
        // into current SN.
        if I->from = nil
            // I was at end of queue when SN was passed to me
            // by the releasing thread. My prev is new tail.
            new_lck->tail := I->prev
            write(L, new_lck)
        else
            // SN was passed to me by a thread already on
            // queue. My prev is now his prev.
            I->from->prev := I->prev
        return     // Now have the lock.
    else
            // It's still not my turn
        if I->from = nil
            // I was at end of queue when SN was passed to me
            // by the releasing thread. I'm still tail.
            new_lck->tail := I
            write(L, new_lck)
            // Pass SN that was passed to me to my prev (if any).
        if (prev != nil)
            // I have a previous node.
            // Send my prev the SN I got, and my identity.
            I->prev->SN := I->SN
            I->prev->from := I
            I->prev->wait := false    // Wake him up.
```

Figure 2:
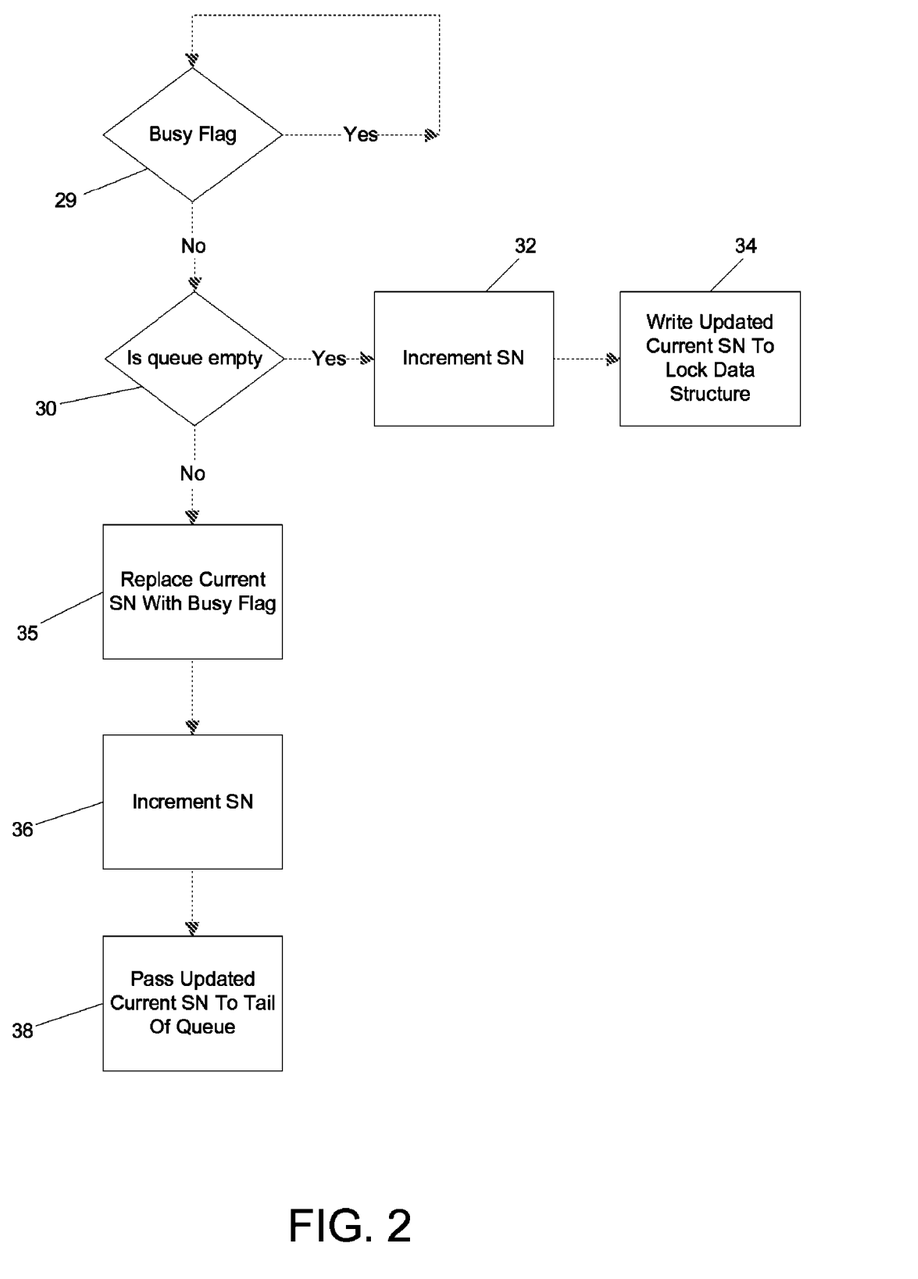
FIG. 2 shows a flow chart of the operations for releasing a lock consistent with an embodiment of the present disclosure.

Once the thread has finished with the resource, the lock may be released to permit access to the resource by other threads. As shown in FIG. 2, once the thread has finished with the lock, the thread may determine if the wait queue is empty 30. Determining if the queue is empty may be achieved, for example, by evaluating the tail identity of the lock data structure. If the tail identity corresponds to an empty queue, e.g., the tail is nil, the thread may increment the sequence number 32, to provide the new, updated current SN, and write the updated current SN to the lock data structure 34. If, however, the queue is not empty, the thread may increment the SN 36, to provide an updated current SN, and may then pass the updated current SN to the tail of the queue 38. For example, the updated current SN may be passed to the thread identified as being the tail in the lock data structure. The updated current SN passed to the tail of the wait queue, e.g., in the form of a sequence number update notification, may be passed through the wait queue in the manner discussed above.

If one thread is attempting to acquire the lock at the same time that another thread is releasing the lock, a race condition may occur. For example, if the thread attempting to acquire the lock sequentially reads the current SN, compares the current SN to the thread SN, and adds itself to the wait queue if the thread SN does not match the current SN, there may be a time gap between when the thread reads the current SN and when the thread joins the queue tail. During the time gap, i.e., before the thread attempting to acquire the lock joins the queue tail, a thread releasing the lock may determine that the queue is empty. The releasing thread may, therefore, increment the sequence number, and write the incremented sequence number as the current SN in the lock data structure and not pass the updated current SN to the queue.

If the thread attempting to acquire the lock reads the current SN before the releasing thread increments the current SN, the acquiring thread may determine that the thread SN does not match the current SN and may join the queue. Similarly, if the releasing thread evaluates whether the queue is empty before the acquiring thread joins the queue tail, the releasing thread may determine that the queue is empty and not pass the updated current SN to the queue. In such a situation, the thread attempting to acquire the lock may remain on the queue indefinitely waiting to be awakened by a sequence number update notification, including the incremented current SN. However, no sequence number update notification may be sent to the queue, because the releasing thread detected an empty queue.

Figure 3:
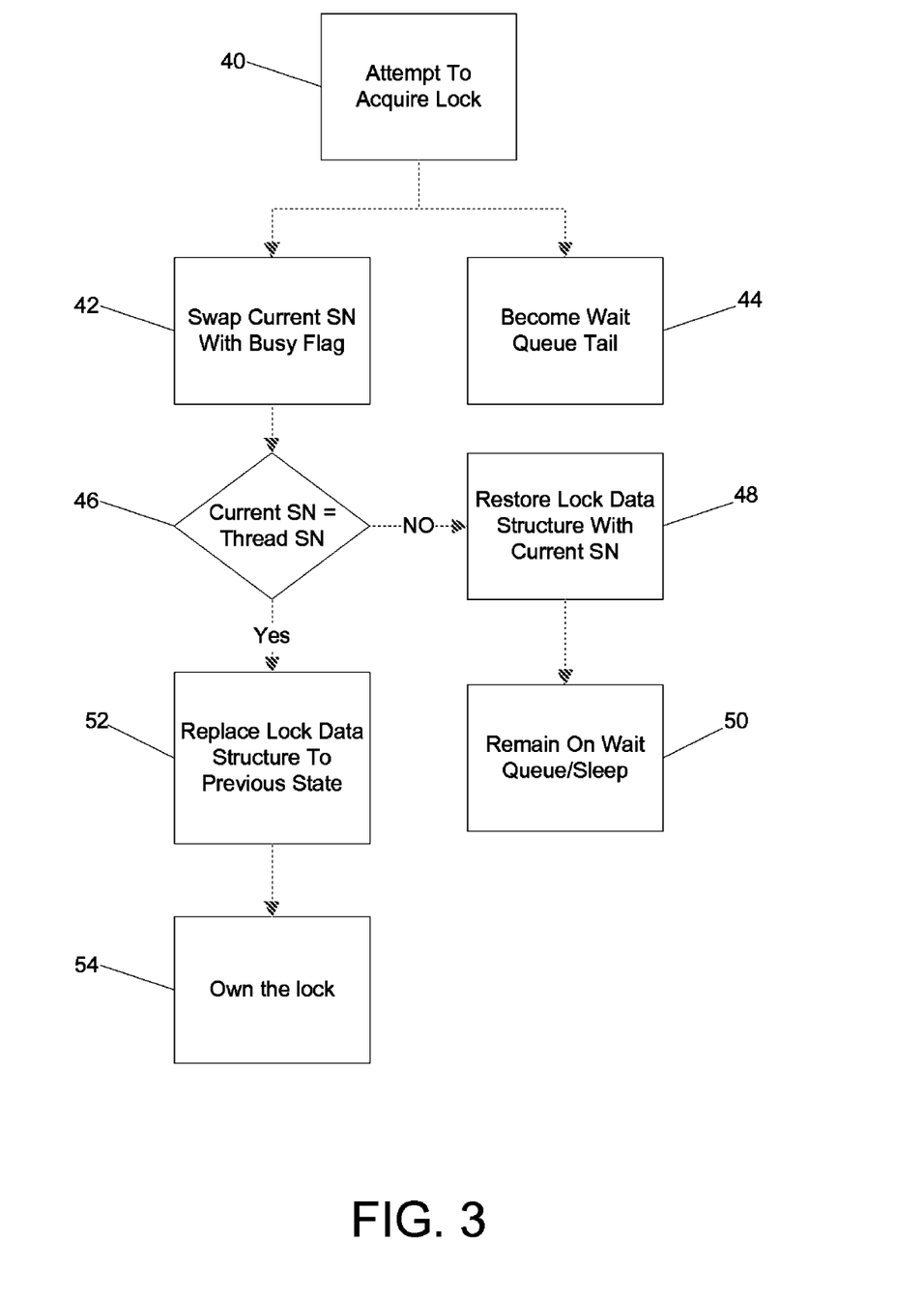
FIG. 3 shows a flow chart of the operations for managing a race condition consistent with an embodiment of the present disclosure.

According to one embodiment, the occurrence of a race condition may be prevented using a busy flag. As shown in FIG. 3, according to one embodiment, when a thread attempts to acquire a lock 40, the thread may simultaneously sample the current SN 42 and temporarily become the wait queue tail 44, e.g., in a single atomic swap process. As discussed previously, the thread may sample the current SN from the lock data structure in order to determine if the thread SN matches the current SN, in which case the thread may acquire a lock. Rather than simply reading the current SN from the lock data structure, the thread may swap the current SN from the lock data structure with a busy flag. The thread may also swap the queue tail identity form the lock data structure with the threads identity, thereby placing the thread as the queue tail. Both the current SN and the queue tail identity may be swapped in the same operation. In such an embodiment, there is no time gap between the reading of the current SN and thread becoming the tail of the queue.

The thread may compare the current SN, swapped from the lock data structure, with the thread SN 46. If the thread SN does not match the current SN, the thread must wait its turn to acquire the lock. The thread may, therefore, restore the lock data structure with the current SN 48, e.g., by replacing the busy flag with the current SN that was swapped out. The thread may remain on the wait queue 50, and may sleep until awaken by a sequence number update notification.

If the current SN swapped from the lock data structure matches the thread SN, the thread is the next-to-go and may acquire the lock. To acquire the lock, the thread may replace the lock data structure to the previous state 52, e.g., by replacing the busy flag with the current SN and replacing the wait queue tail with the previous wait queue tail that was swapped out. With the lock data structure returned to the previous state, the thread may then own the lock 54, and the thread may be removed from the wait queue.

The busy flag may be implemented to alert other threads accessing the lock data structure to the temporarily inconsistent state of the data. In one embodiment, threads detecting the busy flag may not update the lock data structure, but may only read the data. Any thread detecting the busy flag must re-read the lock data structure each time the busy flag is detected, until the busy flag is removed. As discussed above, when a first thread is attempting to acquire the lock, the current SN in the lock data structure may be updated to the busy flag. A second thread attempting to acquire the lock while a first thread is also attempting to acquire the lock will read the busy flag as the current SN. The second thread will continue re-reading the current SN, without modifying the lock data structure, until the first thread has either acquired the lock, or failed to acquire the lock, as described herein. Once the first thread has completed its attempt to acquire the lock, the busy flag may be lifted, i.e., replaced with the current SN. Once the lock data structure has been updated to remove the busy flag, the second thread may attempt to acquire the lock.

With reference to FIG. 2, in another example, a thread attempting to release a lock may not update the lock data structure if another thread is currently trying to acquire the lock. As discussed above, the current SN of the lock data structure may be updated to include a busy flag while a thread is attempting to acquire a lock. When releasing a lock, a thread may evaluate current SN of the lock data structure to determine if a busy flag is in place 29. If the lock data structure includes a busy flag, the thread releasing the lock may continue to re-read the lock data structure until the busy flag is lifted and the current SN is restored to its previous state. Once the busy flag has been lifted, the thread may continue with releasing the lock.

Consistent with a further aspect, the use of a busy flag may prevent a thread from becoming the tail of the wait queue while a sequence number update notification is being evaluated by the wait queue, which may cause the thread to never receive the sequence number update notification. With reference also to FIG. 2, if the wait queue is determined to not be empty, the thread releasing the lock may replace the current SN in the lock data structure with a busy flag 35, increment the current SN 36, and pass the updated, i.e., incremented, current SN to the tail of the queue as a sequence number update notification. If the next-to-go thread is not present on the queue, i.e., no thread in the queue acquires the lock, the busy flag may be lifted and the incremented current SN may be placed as the current SN in the lock data structure. Once the lock data structure has been restored to include the current SN, the thread attempting to acquire the lock may proceed with the acquire attempt as described herein.

The busy flag may be represented in a variety of ways. In one embodiment, the sequence number assigned to the various threads may be in the range from 0 to max SN, in which max SN equals the highest available sequence number which may be assigned to a thread. The current SN in the lock data structure, which determines the next-to-go thread, may similarly be in the range between 0 and max SN. When max SN is reached the current SN may wrap back to 0. In such an embodiment, the value −1 may be used as a busy flag. Since the value −1 is outside of the range of the 0 to max SN, a −1 busy flag may be recognized as a special flag and not confused as a possible sequence number of a thread.

Table 3 includes pseudo-code for an exemplary procedure for releasing a lock including the use of a busy flag, consistent with one aspect of the present disclosure. The procedure represented by the exemplary pseudo-code generally corresponds to the preceding description and the corresponding flow diagram. The pseudo-code provided in Table 2, relating to an exemplary procedure for acquiring a lock similarly includes the use of a busy flag as discussed above.

TABLE 3

Pseudo-code corresponding to an exemplary process to release a lock.

```
procedure release_lock (L : ^lock, I: ^qnode)
    act_lck, cmp_lck, new_lck : lock
    cmp_lck->tail = nil    // Assume fast case -- queue is empty
    cmp_lck->currSN = mySN
    new_lck->tail = nil
    new_lck->currSN = mySN+1    // Incremented SN to swap
    with current one
    act_lck = cmp_and_swap(L, cmp_lck, new_lck)
    if (act_lck->tail != nil)
        // If the cmp_and_swap succeeded (because queue was not
        // empty) then release is done. Otherwise, we need to find the
        // thread at end of queue to notify of the release. Also, need to
        // put −1 into the current SN to prevent other threads from
        // joining the queue while the threads already on queue check
        the updated SN.
        new_lck->currSN = −1
        repeat
            // Repeat conditionally swapping −1 into current SN until
```

TABLE 3-continued

Pseudo-code corresponding to an exemplary process to release a lock.

```
            it succeeds. //
            This will normally succeed 1st time, except if another thread
            // joined the queue between the cmp_and_swap which got the
            // current tail and the next cmp_and_swap which swaps
            // current SN of −1 in along with that tail.
            new_lck->tail = act_lck->tail // Value that was at tail when
                // previous swap failed.
            act_lck = cmp_and_swap(L, act_lck, new_lck)
        until (act_lck->currSN = mySN) && (act_lck->tail =
        new_lck->tail)
        // The flag value of −1 is now in the lock datastructure. Notify the
        // thread at end of queue of the update to current SN.
        act_lck->tail->SN := mySN+1      // Send the incremented SN.
        act_lck->tail->from := nil    // No one is after the tail.
        act_lck->tail->wait := false    // Wake him up.
```

Figure 4:
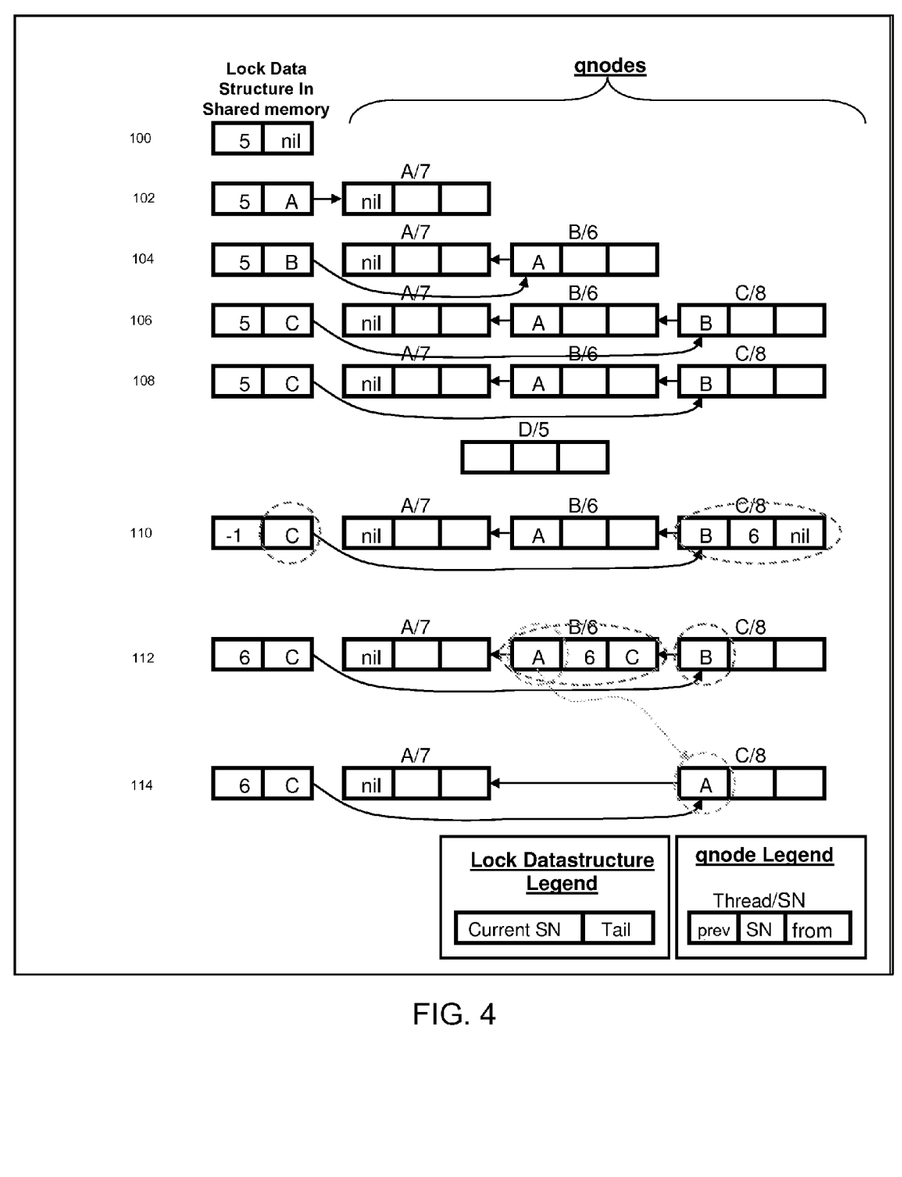
FIG. 4 depicts an exemplary implementation of a lock management system consistent with an aspect of the present disclosure.

Turning to FIG. 4, there is shown an exemplary implementation of lock management for threads consistent with an aspect of the present disclosure. The exemplary implementation is shown in terms of the lock data structure and qnode data structures of the corresponding wait queue. As shown, the lock data structure may include the current SN and a pointer to the current queue tail ("tail"). The current SN may indicate the thread which may currently acquire the lock. Each node on the wait queue (each "qnode") may include a thread identifier along with the thread SN. Each qnode may also include a pointer to the previous thread on the queue ("prev"), the sequence number being passed along the queue, and a pointer to the thread from which the sequence number was passed ("from").

In a first state 100, the lock data structure, which is stored in shared memory, may include the current SN, which is the sequence number of the thread which may acquire the lock. As shown, in the first state 100 the current SN is 5, indicating that a thread having the sequence number 5 may acquire the lock. The lock data structure also includes a pointer to the tail of the wait queue. In the illustrated first state 100, the wait queue is empty, which is indicated by a "nil" in the tail pointer of the lock data structure.

In a second state 102, thread A attempts to acquire a lock. Thread A has a sequence number 7. Thread A may attempt to acquire the lock by comparing the sequence number of thread A, i.e., 7, to the current sequence number, 5, stored in the lock data structure. Thread A fails to acquire the lock because the thread SN does not match the current SN. Thread A becomes the tail of the wait queue, and the tail pointer of the lock data structure is updated with a pointer to thread A. The qnode of thread A includes a pointer to the previous thread in the queue. In the illustrated case no threads precede thread A in the queue. The prev field of the qnode of thread A is, therefore, "nil". Thread A may sleep until awaken by a sequence number update notification.

In a third state 104, a thread B attempts to acquire a lock. Similar to thread A, thread B compares the thread SN, 6, to the current SN. As the thread SN does not match the current SN, thread B may fail to acquire the lock and becomes the tail of the wait queue. Thread B updates the lock data structure to include a pointer to thread B as the queue tail and inserts the pointer to thread A, from the previous tail of the lock data structure, into the qnode for thread B. Thread B may sleep until awakened by a sequence number update notification.

In a third state 106, a thread C attempts to acquire a lock. Thread C compares the thread SN to the current SN, and fails to acquire the lock because the thread SN and the current SN do not match. As with the previous threads, upon failing to acquire the lock, thread C becomes the tail of the wait queue, updating the lock data structure with a pointer the thread C as the tail of the queue. The qnode for thread C includes a pointer to thread B as the previous thread in the queue. Thread C may sleep until awakened by a sequence number update notification.

As shown, the threads A, B, and C in the queue are not arranged according to the sequence in which they may acquire the lock. That is, thread C having a thread SN of 8 is the queue tail and would be the last thread to acquire the lock. Thread A is the head of the queue and would be the second of the three threads to acquire the lock. The first thread to acquire the lock is thread B, which is disposed in the queue between threads A and C. Rather than being arranged according to the order in which they may acquire the lock, the threads in the queue are arranged in the order in which the threads attempted to acquire the lock. Consistent with the present disclosure, it may not be necessary for the threads to be arranged in the order in which they may acquire the lock, or any other particular order. Accordingly, it may not be necessary to re-order the queue every time another thread is added to the queue.

In a fourth state 108, thread D attempts to acquire the lock. Thread D compares the thread SN to the current SN, and is able to acquire the lock because the thread SN matches the current SN. Because thread D is able to acquire the lock, thread D may not join the queue. In an embodiment configured to manage race conditions, as described previously, thread D may temporarily become the tail of the wait queue, while the thread SN is being compared to the current SN. Similarly, the current SN in the lock data structure may temporarily be swapped with a busy flag, e.g., −1. Once thread D acquires the lock, the lock data structure may be restored to the previous state. For example, the busy flag may be replaced with the current SN, i.e., with thread D's SN, and the tail pointer may be replaced with a pointer to the previous thread, i.e., a pointer to thread C.

In a fifth state 110, thread D releases the lock. Consistent with the management of race conditions, the current SN in the lock data structure is set to the busy flag, −1. Additionally, the thread releasing the lock, i.e., thread D may increment current SN, e.g., to 6 in the illustrated example, and may pass the incremented current SN to thread C, which is indicated as the tail of the wait queue by the lock data structure, as a sequence number update notification. Thread C may be awakened by the sequence number update notification and may compare the updated current SN to the thread SN. Thread C may fail to acquire the lock because the updated current SN does not match the thread SN. After failing to acquire the lock, thread C may pass the sequence number update notification to thread B, which is stored as the previous thread to thread C in thread C's qnode.

In a sixth state 112, thread B may be awakened by the sequence number update notification passed from thread C. Thread C may be stored as the thread that the sequence number update notification was received from, e.g., as the "from" in thread B's qnode data structure. Thread B may compare the updated current SN to the thread SN. Because the current SN matches the thread SN, thread B may acquire the lock and may exit the queue. When thread B exits the queue, thread C's qnode may be updated to include a pointer to thread A as the previous thread in the queue, i.e., as thread B's "prev". That is, thread B sends it "prev" of thread A to the thread that passed thread B the updated sequence number notification, i.e., thread B's "from", which was thread C. Thread C replaces it's "prev", which was thread B, with thread B's "prev", which is thread A. Once updated, the qnode data structures may provide a continuous chain, accommodating the removal of thread B from the wait queue, as shown in the seventh state 114.

While not shown, it will be appreciated that when the wait queue tail acquires the lock, the lock data structure may be updated with a new queue tail upon release of the lock. If the thread releasing the lock is the wait queue tail, the "tail" field of the lock data structure may be updated with the releasing thread's "prev", to provide a pointer to the new wait queue tail. If the thread releasing the lock was the only thread in the queue, e.g., as shown in the second state 102, the thread's "prev" may be nil. When the thread releases the lock, the "tail" in the lock data structure may be updated with nil, to indicate that the wait queue is empty.

Figure 5:
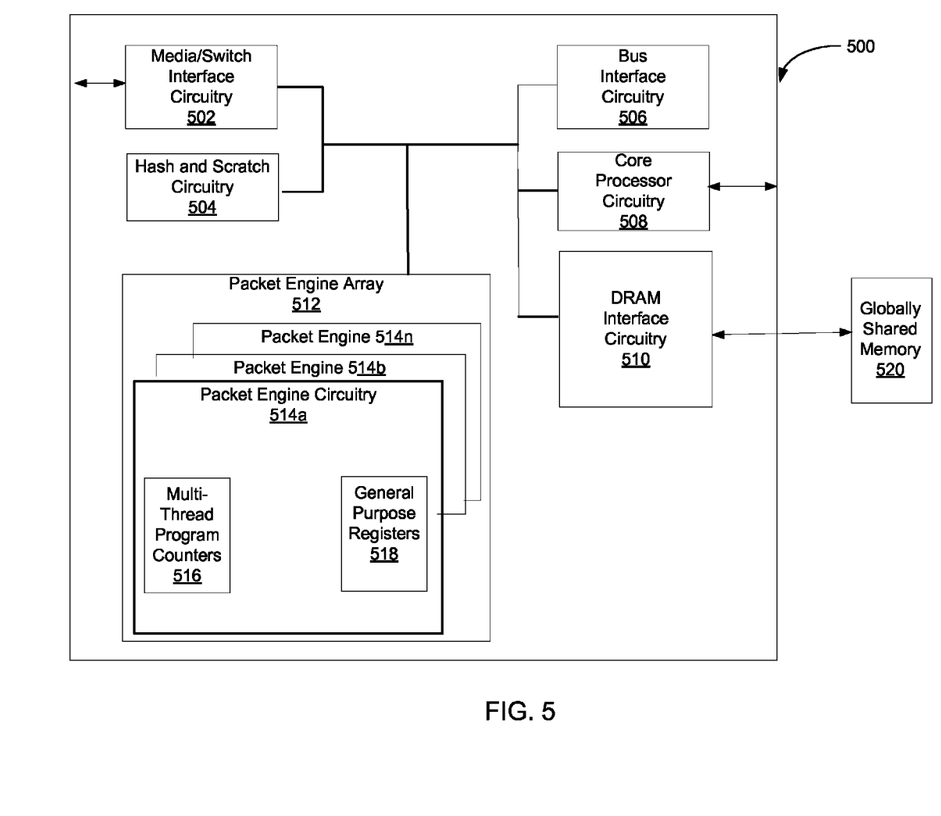
FIG. 5 is a diagram illustrating one exemplary integrated circuit embodiment.

The embodiments of FIGS. 1-4 may be implemented in a variety of multi-threaded processing environments. For example, FIG. 5 is a diagram illustrating one exemplary integrated circuit embodiment 500 in which the management of sequence locks herein may be implemented. "Integrated circuit", as used in any embodiment herein, means a semiconductor device and/or microelectronic device, such as, for example, but not limited to, a semiconductor integrated circuit chip. The IC 500 of this embodiment may include features of an Intel® Internet eXchange network processor (IXP). However, the IXP network processor is only provided as an example, and the operative circuitry described herein may be used in other network processor designs and/or other multi-threaded integrated circuits.

The IC 500 may include media/switch interface circuitry 502 (e.g., a CSIX interface) capable of sending and receiving data to and from devices connected to the integrated circuit such as physical or link layer devices, a switch fabric, or other processors or circuitry. The IC 500 may also include hash and scratch circuitry 504 that may execute, for example, polynomial division (e.g., 48-bit, 64-bit, 128-bit, etc.), which may be used during some packet processing operations. The IC 500 may also include bus interface circuitry 506 (e.g., a peripheral component interconnect (PCI) interface) for communicating with another processor such as a microprocessor (e.g. Intel Pentium®, etc.) or to provide an interface to an external device such as a public-key cryptosystem (e.g., a public-key accelerator) to transfer data to and from the IC 500 or external memory. The IC 500 may also include core processor circuitry 508. In this embodiment, core processor circuitry 508 may comprise circuitry that may be compatible and/or in compliance with the Intel® XScale™ Core micro-architecture described in "Intel® XScale™ Core Developers Manual," published December 2000 by the Assignee of the subject application. Of course, core processor circuitry 508 may comprise other types of processor core circuitry without departing from this embodiment. Core processor circuitry 508 may perform "control plane" tasks and management tasks (e.g., look-up table maintenance, etc.). Alternatively or additionally, core processor circuitry 508 may perform "data plane" tasks (which may be typically performed by the packet engines included in the packet engine array 512, described below) and may provide additional packet processing threads.

Integrated circuit 500 may also include a packet engine array 512. The packet engine array may include a plurality of packet engines 514a, 514b, . . . , 514n. Each packet engine 514a, 514b, . . . , 514n may provide multi-threading capability for executing instructions from an instruction set, such as a reduced instruction set computing (RISC) architecture. Each packet engine in the array 512 may be capable of executing processes such as packet verifying, packet classifying, packet forwarding, and so forth, while leaving more complicated processing to the core processor circuitry 508. Each packet engine in the array 512 may include e.g., eight threads that interleave instructions, meaning that as one thread is active (executing instructions), other threads may retrieve instructions for later execution. Of course, one or more packet engines may utilize a greater or fewer number of threads without departing from this embodiment. The packet engines may communicate among each other, for example, by using neighbor registers in communication with an adjacent engine or engines or by using shared memory space.

In this embodiment, at least one packet engine, for example packet engine 514a, may include various operative circuitry, for example, multi-thread program counters 516 and general purpose registers 518. In this embodiment, the general purpose registers 518 may be configured to store the qnodes, including, for example, the thread identification, sequence number, pointer to the previous thread in the queue, current sequence number being passed through the queue, and a pointer to the thread qnode from which the current sequence number was passed.

In this embodiment, the lock data structure, including for example, the current sequence number, and pointer to the tail of the wait queue, may be stored in a globally shared memory 520, which may include an external memory (e.g., external DRAM) coupled to the IC 500. Integrated circuit 500 may also include DRAM interface circuitry 510. DRAM interface circuitry 510 may control read/write access to the globally shared memory 520. The packet engine 514a may issue an instruction to DRAM interface circuitry 510 to permit the threads to read, update, etc., the lock data structure.

The globally shared memory 520 may include one or more of the following types of memory: semiconductor firmware memory, programmable memory, non-volatile memory, read only memory, electrically programmable memory, static random access memory (e.g., SRAM), flash memory, dynamic random access memory (e.g., DRAM), magnetic disk memory, and/or optical disk memory. Either additionally or alternatively, memory 520 may include other and/or later-developed types of computer-readable memory. Machine readable firmware program instructions may be stored in memory 520, and/or other memory. These instructions may be accessed and executed by the integrated circuit 500. When executed by the integrated circuit 500, these instructions may result in the integrated circuit 500 performing the operations described herein as described above with reference to FIGS. 1-4.

Figure 6:
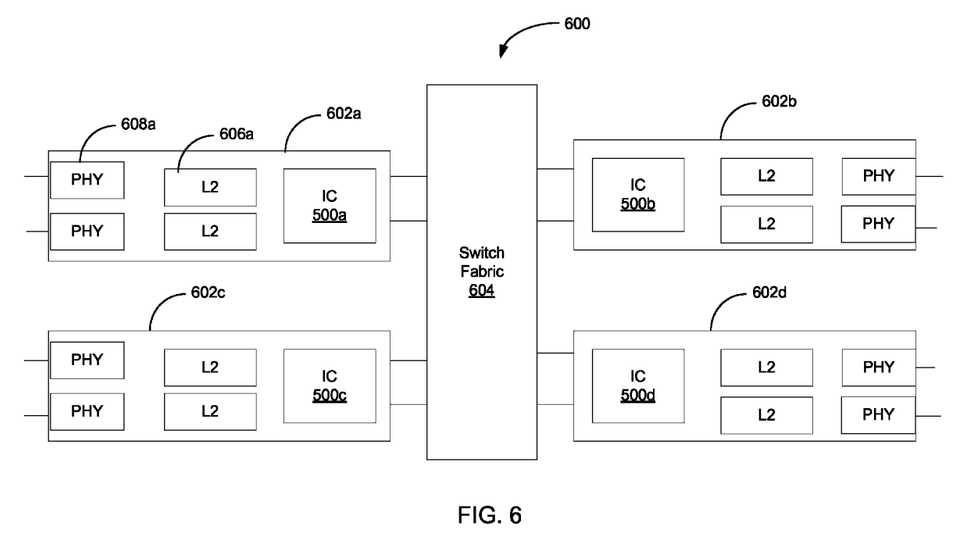
FIG. 6 is a diagram illustrating one exemplary system embodiment.

FIG. 6 depicts one exemplary system embodiment 600. This embodiment may include a collection of line cards 602a, 602b, 602c and 602d ("blades") interconnected by a switch fabric 604 (e.g., a crossbar or shared memory switch fabric). The switch fabric 604, for example, may conform to CSIX or other fabric technologies such as HyperTransport, Infiniband, PCI-X, Packet-Over-SONET, RapidIO, and Utopia. Individual line cards (e.g., 602a) may include one or more physical layer (PHY) devices 608a (e.g., optic, wire, and wireless PHYs) that handle communication over network connections. The PHYs may translate between the physical signals carried by different network mediums and the bits (e.g., "0"-s and "1"-s) used by digital systems. The line cards may also include framer devices 606a (e.g., Ethernet, Synchronous Optic Network (SONET), High-Level Data Link (HDLC) framers or other "layer 2" devices) that can perform operations on frames such as error detection and/or correction. The line cards shown may also include one or more integrated circuits, e.g., 500a, which may include network processors, and may be embodied as integrated circuit packages (e.g., ASICs). In addition to the operations described above with reference to integrated circuit 500, in this embodiment integrated circuit 500a may also perform packet processing operations for packets received via the PHY(s) 608a and direct the packets, via the switch fabric 604, to a line card providing the selected egress interface. Potentially, the integrated circuit 500a may perform "layer 2" duties instead of the framer devices 606a.

Any of the operations and/or methods described herein may be implemented in a computer program that may be stored on a storage medium having instructions to program a system (e.g., a machine) to perform these operations and/or methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

Consistent with one aspect, the present disclosure may eliminate the need for threads waiting to acquire a lock to periodically poll the lock data structure for sequence number updates. Eliminating the need to poll sequence number updates may save compute cycles and memory accesses. Instead of polling for sequence number updates, the threads waiting to acquire the lock may sleep until awakened by a sequence number update notification.

According to another aspect, lock passing may be distributed among the threads, which may limit central bottlenecks. Because there may be no need to re-order the threads waiting to acquire the lock as additional threads are added to the queue, a system consistent with the present disclosure may be highly scaleable, and may only be limited by memory access and thread to thread communication. Furthermore, the lock data structure may be in shared memory which may have a high capacity. The qnodes may be in shared memory, e.g., for conventional uP, or in transfer registers, e.g., for Intel IXP NPU MicroEngines. In embodiments in which qnodes are in the transfer registers, the transfer registers may only be in use when the thread is acquiring a lock. At other times, the transfer registers may be free for other uses.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method comprising:
assigning a sequence number to a first software thread;
determining if said sequence number of said first software thread matches a current sequence number of a software lock, and if said sequence number of said first software thread does not match said current sequence number of said software lock, said method further comprising:
placing said first software thread into a wait queue, said wait queue comprising said first software thread and at least a second software thread, wherein said second software thread precedes said first software thread in said wait queue;

receiving, by said first software thread, a notification of an updated current sequence number;

determining if said sequence number of said first software thread matches said updated current sequence number;

acquiring said software lock and removing said first software thread from said wait queue if said sequence number of said first software thread matches said updated current sequence number; and remaining in said wait queue and passing said notification to said second software thread if said updated current sequence number does not match said sequence number of said first software thread.

2. The method of claim 1, wherein placing said first software thread into said wait queue comprises associating a node with said wait queue corresponding to said first software thread, said node comprising a pointer to a node of said wait queue corresponding to said second software thread.

3. The method of claim 1, wherein removing said first software thread from said wait queue comprises providing a node in said wait queue corresponding to a thread following said first software thread in said wait queue with a pointer to a node in said wait queue preceding said first software thread.

4. The method of claim 1, wherein determining if said sequence number of said first software thread matches said current sequence number comprises:

replacing said current sequence number with a busy flag in a shared memory location, said busy flag preventing said current sequence number from being modified;

comparing said sequence number of said first software thread to said current sequence number; and replacing said busy flag with said current sequence number in said shared memory location.

5. The method of claim 4, wherein determining if said sequence number of said first software thread matches said current sequence number further comprising placing said first software thread into said wait queue.

6. The method of claim 5, comprising removing said first software thread from said wait queue if said sequence number of said first software thread matches said current sequence number.

7. An article comprising a non-transitory storage medium having stored thereon instruction that when executed by a machine result in the following:

assigning a sequence number to a first software thread;

determining if said sequence number of said first software thread matches a current sequence number of a software lock, and if said sequence number of said first software thread does not match said current sequence number, said instructions further resulting in:

placing said first software thread into a wait queue, said wait queue comprising said first software thread and at least a second software thread, wherein said second software thread precedes said first software thread in said wait queue;

receiving, said first software thread, a notification of an updated current sequence number;

determining if said sequence number of said first software thread matches said updated current sequence number;

acquiring said software lock and removing said first software thread from said wait queue if said sequence number of said first software thread matches said updated current sequence number; and remaining in said wait queue and passing said notification to said second software thread if said updated current sequence number does not match said sequence number of said first software thread.

8. The article of claim 7, wherein the instructions that when executed result in placing said first software thread into said wait queue, result in the operations of:

associating a node with said wait queue corresponding to said first software thread, said node comprising a pointer to a node of said wait queue corresponding to a second software thread, said second software thread preceding said first software thread in said wait queue; and said first software thread passing said notification to said second software thread if said updated sequence number does not match said sequence number of said first software thread.

9. The article of claim 7, wherein the instructions when executed further result in acquiring said software lock and removing said first software thread from said wait queue if said updated current sequence number matches said sequence number of said first software thread.

10. The article of claim 9, wherein the instructions that result in removing said first software thread from said wait queue result in providing a node in said wait queue corresponding to a thread following said first software thread in said wait queue with a pointer to a node in said wait queue preceding said first software thread.

11. The article of claim 7, wherein the instructions that result in determining if said sequence number of said first software thread matches said current sequence number when executed result in:

replacing said current sequence number with a busy flag in a shared memory location, said busy flag preventing said current sequence number from being modified;

comparing said sequence number of said first software thread to said current sequence number; and replacing said busy flag with said current sequence number in said shared memory location.

12. The article of claim 11, wherein the instructions that result in determining if said sequence number of said first software thread matches said current sequence number further result in placing said first software thread into said wait queue.

13. The article of claim 11, wherein the instructions, when executed, further result in removing said first software thread from said wait queue if said sequence number of said first software thread matches said current sequence number.

14. A network device comprising:

a switch fabric; and multiple blades coupled to the switch fabric, at least one of the blades comprising an integrated circuit (IC) configured to execute instructions using a plurality of threads, said IC is further configured to:

assign a sequence number to a first software thread;

determine if said sequence number of said first software thread matches a current sequence number of a software lock, and if said sequence number of said first software thread does not match said current sequence number, said IC is further configured to:

place said first software thread into a wait queue, said wait queue comprising said first software thread and at least a second software thread, wherein said second software thread precedes said first software thread in said wait queue;

receive a notification of an updated current sequence number;

determine if said sequence number of said first software thread matches said updated current sequence number;

acquire said software lock and removing said first software thread from said wait queue if said sequence number of said first software thread matches said updated current sequence number; and remain in said wait queue and passing said notification to said second software thread if said updated current sequence number does not match said sequence number of said first software thread.

15. The network device of claim 14, wherein said IC configured to place said first software thread into said wait queue is configured to associate a node with said wait queue corresponding to said first software thread, said node comprising a pointer to a node of said wait queue corresponding to a second software thread, said second software thread preceding said first software thread on said wait queue, wherein said IC is further configured to pass said notification from said first software thread to said second software thread if said updated sequence number does not match said sequence number of said first software thread.

16. The network device of claim 14, wherein said IC is further configured to acquire said software lock and remove said first software thread from said wait queue if said updated current sequence number matches said sequence number of said first software thread.

17. The network device of claim 16, wherein said IC configured to remove said first software thread from said wait queue is configured to provide a node in said wait queue corresponding to a thread following said first software thread in said wait queue with a pointer to a node in said wait queue preceding said first software thread.

18. The network device of claim 14, wherein said IC configured to determine if said sequence number of said first software thread matches said current sequence number is configured to:

replace said current sequence number with a busy flag in a shared memory location, said busy flag configured to prevent said current sequence number from being modified;

compare said sequence number of said first software thread to said current sequence number; and replace said busy flag with said current sequence number in said shared memory location.

19. The network device of claim 18, wherein said IC configured to determine if said sequence number of said first software thread matches said current sequence number is further configured to place said first software thread into said wait queue.

20. The network device of claim 19, wherein said IC is configured to remove said first software thread from said wait queue if said sequence number of said first software thread matches said current sequence number.

* * * * *